(12) United States Patent
Loebner

(10) Patent No.: US 11,342,136 B2
(45) Date of Patent: May 24, 2022

(54) TENSIONING MECHANISM FOR CLAMPING A PRE-LOADED SPRING OF A SPRING-LOADED ACCUMULATOR DRIVE

(71) Applicant: Siemens Energy Global GmbH & Co. KG, Munich (DE)

(72) Inventor: Friedrich Loebner, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 101 days.

(21) Appl. No.: 16/648,722

(22) PCT Filed: Aug. 23, 2018

(86) PCT No.: PCT/EP2018/072707
§ 371 (c)(1),
(2) Date: Mar. 19, 2020

(87) PCT Pub. No.: WO2019/057433
PCT Pub. Date: Mar. 28, 2019

(65) Prior Publication Data
US 2020/0227213 A1 Jul. 16, 2020

(30) Foreign Application Priority Data
Sep. 22, 2017 (DE) .............................. 102017216804

(51) Int. Cl.
*F03G 1/08* (2006.01)
*F16D 47/04* (2006.01)
(Continued)

(52) U.S. Cl.
CPC ............. *H01H 3/3021* (2013.01); *F03G 1/08* (2013.01); *F16D 47/04* (2013.01); *F16H 33/02* (2013.01);
(Continued)

(58) Field of Classification Search
USPC ......................................................... 200/400
See application file for complete search history.

(56) References Cited

U.S. PATENT DOCUMENTS

| 4,806,715 A | 2/1989 | Harz et al. |
| 5,723,836 A * | 3/1998 | Okuno ..................... H01H 3/30 200/501 |

(Continued)

FOREIGN PATENT DOCUMENTS

| CN | 87105132 A | 3/1988 |
| CN | 1146256 A | 3/1997 |

(Continued)

*Primary Examiner* — Toan T Vu
*Assistant Examiner* — Xuan Ly
(74) *Attorney, Agent, or Firm* — Laurence A. Greenberg; Werner H. Stemer; Ralph E. Locher

(57) ABSTRACT

A tensioning mechanism for tensioning a pre-loaded spring of a spring-loaded accumulator drive. The tensioning mechanism includes a tensioning wheel coupled to the pre-loaded spring, an intermediate shaft coupled to the tensioning wheel, an idler gear that can be driven by a clamping motor, a freewheel coupled to the idler gear, a locking mechanism for detachably locking the tensioning wheel in a tensioned state of the pre-loaded spring, and a dog clutch configured to couple the freewheel to the intermediate shaft in order to tension the pre-loaded spring and to uncouple same from the intermediate shaft in the tensioned state of the pre-loaded spring.

12 Claims, 2 Drawing Sheets

(51) Int. Cl.
*F16H 33/02* (2006.01)
*H01H 3/30* (2006.01)
*H01H 33/40* (2006.01)
*H01H 3/58* (2006.01)
*F16D 11/14* (2006.01)
*F16D 41/00* (2006.01)

(52) U.S. Cl.
CPC ............ *H01H 3/30* (2013.01); *H01H 3/3005* (2013.01); *H01H 3/3031* (2013.01); *H01H 3/58* (2013.01); *H01H 33/40* (2013.01); *F16D 11/14* (2013.01); *F16D 41/00* (2013.01)

(56) References Cited

U.S. PATENT DOCUMENTS

| | | | |
|---|---|---|---|
| 7,902,472 | B2 | 3/2011 | Godesa |
| 2008/0202910 | A1 | 8/2008 | Lutzke |
| 2009/0050460 | A1 | 2/2009 | Ahn |
| 2009/0050605 | A1 | 2/2009 | Ahn |
| 2010/0078300 | A1 | 4/2010 | Freundt et al. |
| 2010/0089734 | A1 | 4/2010 | Freundt |
| 2011/0226074 | A1 | 9/2011 | Engemann et al. |
| 2016/0240330 | A1* | 8/2016 | Huang .................. F16D 23/12 |
| 2017/0343089 | A1* | 11/2017 | Bartz ..................... H01H 3/34 |

FOREIGN PATENT DOCUMENTS

| | | | |
|---|---|---|---|
| CN | 101283423 A | | 10/2008 |
| CN | 101283424 A | | 10/2008 |
| CN | 101379576 A | | 3/2009 |
| CN | 201956270 | * | 8/2011 |
| CN | 201956270 U | | 8/2011 |
| CN | 102194580 A | | 9/2011 |
| DE | 19642031 A1 | | 4/1997 |
| DE | 102014224405 A1 | | 6/2016 |
| EP | 0460390 A2 | | 12/1991 |
| JP | 2001509359 A | | 7/2001 |
| RU | 2110103 C1 | | 4/1998 |
| RU | 2110866 C1 | | 5/1998 |
| RU | 2397570 C2 | | 8/2010 |
| RU | 2398304 C2 | | 8/2010 |
| RU | 2411602 C2 | | 2/2011 |

\* cited by examiner

TENSIONING MECHANISM FOR CLAMPING A PRE-LOADED SPRING OF A SPRING-LOADED ACCUMULATOR DRIVE

BACKGROUND OF THE INVENTION

Field of the Invention

The invention concerns a tensioning mechanism for tensioning a pre-loaded spring of a spring-loaded accumulator drive, in particular for a circuit breaker.

Spring-loaded accumulator drives are used in particular as drives for switching circuit breakers. Circuit breakers are electrical switches which are designed for high electrical currents and voltages, in order in particular to be able to disconnect high overload currents and short-circuit currents safely. For this, circuit breakers have a breaker unit with at least one movable switch element for opening and closing a current path. To move the switch element in a switching process, circuit breakers store the energy required for the switching process. Spring-loaded accumulator drives store this energy in pre-loaded springs which are tensioned in order to contain the energy. A pre-loaded spring is for example tensioned by a tensioning motor which is connected to the pre-loaded spring via a tensioning mechanism. Similarly, spring-loaded accumulator drives are also used for example as drives for switching load disconnect switches.

SUMMARY OF THE INVENTION

The invention is based on the object of indicating an improved tensioning mechanism for tensioning a pre-loaded spring of a spring-loaded accumulator drive.

This object is achieved according to the invention as claimed.

Advantageous embodiments of the invention are the subject of the subclaims.

A tensioning mechanism according to the invention for tensioning a pre-loaded spring of a spring-loaded accumulator drive comprises a tensioning wheel coupled to the pre-loaded spring, an intermediate shaft coupled to the tensioning wheel, an intermediate gear that can be driven by a tensioning motor, a freewheel coupled to the intermediate gear, a locking mechanism for releasably locking the tensioning wheel when the pre-loaded spring is in a tensioned state, and a dog clutch which couples the freewheel to the intermediate shaft in order to tension the pre-loaded spring, and decouples same from the intermediate shaft when the pre-loaded spring is in the tensioned state.

On tensioning of the pre-loaded spring, the intermediate shaft transfers rotations of the intermediate gear via the freewheel and the dog clutch to the tensioning wheel, and thereby allows tensioning of the pre-loaded spring by the tensioning motor which drives the intermediate gear directly or indirectly. The locking mechanism can lock the tensioning wheel when the pre-loaded spring is in the tensioned state, so that the pre-loaded spring remains tensioned until the lock is released in order to dissipate the energy stored by the pre-loaded spring. When the pre-loaded spring is in the tensioned state, the dog clutch decouples the intermediate shaft from the freewheel and the intermediate gear, so that in particular when the tensioning motor is running on, the intermediate gear cannot transmit forces to the intermediate shaft and the tensioning wheel. Without the dog clutch, in the tensioned state of the pre-loaded spring, these forces would be transmitted to the intermediate shaft and to the components of the tensioning mechanism coupled to the intermediate shaft, such as components of the locking mechanism, and thereby stress and load said components. The dog clutch therefore advantageously relieves the load on the intermediate shaft and the components of the tensioning mechanism coupled thereto when the pre-loaded spring is in the tensioned state.

In one embodiment of the invention, the dog clutch has a first clutch jaw coupled rotationally fixedly to the intermediate shaft, and a second clutch jaw connected to the freewheel, wherein the first clutch jaw is movable between a first end position in which it bears against the second clutch jaw and a second end position in which it is separated from the second clutch jaw and which it assumes when the pre-loaded spring is in the tensioned state. Because of the rotationally fixed coupling of the first clutch jaw to the intermediate shaft, rotations of the intermediate shaft are transmitted to the first clutch jaw. The movability of the first clutch jaw allows its coupling to the second clutch jaw and the freewheel connected thereto in order to tension the pre-loaded spring, and allows the decoupling of the clutch jaws when the pre-loaded spring is in the tensioned state.

For example, the first clutch jaw is coupled by a coupling element to the intermediate shaft, wherein the coupling element is guided through a transverse opening in the intermediate shaft, running perpendicularly to a longitudinal axis of the intermediate shaft, and in the transverse opening is movable between a first position defining the first end position of the first clutch jaw and a second position defining the second end position of the first clutch jaw. The coupling element is for example formed as a tube or bolt, the longitudinal axis of which is arranged perpendicularly to the longitudinal axis of the intermediate shaft and the ends of which protrude into recesses in the first clutch jaw. The coupling element allows movement of the first clutch jaw by a movement of the coupling element.

Furthermore, for example a switching pin is provided which is movably mounted in the intermediate shaft in a longitudinal opening running along the longitudinal axis of the intermediate shaft, and is coupled to the coupling element. In this way, the first clutch jaw can be moved via the coupling element by movement of the switching pin between its end positions.

Furthermore, it is provided for example that a deactivation end of the switching pin protrudes out of the longitudinal opening, and a deactivation element is arranged on the tensioning wheel which moves the deactivation end of the switching pin towards the longitudinal opening when the pre-loaded spring is in the tensioned state, so that the coupling element is moved from its first into its second position. For example, the deactivation element has a contact end protruding radially from the tensioning wheel and having an oblique contact face which bears on the deactivation end of the switching pin on movement of the latter. By the deactivation element, the tensioning wheel is coupled to the switching pin in a position in which the pre-loaded spring is tensioned, wherein the deactivation element moves the switching pin and thereby opens the dog clutch.

Preferably, each of the two clutch jaws runs in a ring form around the intermediate shaft. In this way, in simple fashion a reliable coupling is achieved between the dog clutch and the intermediate shaft and freewheel.

Furthermore, for example, a return spring is provided which is coupled to the first clutch jaw and, in the second end position of the first clutch jaw, exerts a spring force on the first clutch jaw in the direction of the first end position. The return spring allows the first clutch jaw to move from its second end position to its first end position when the deactivation element releases the switching pin on relaxation of the pre-loaded spring. In this way, the dog clutch is closed again and the tensioning mechanism is ready to retension the pre-loaded spring after relaxation of the pre-loaded spring.

The freewheel has for example a freewheel ring which runs around the intermediate shaft and to which the second clutch jaw is connected. This allows a reliable coupling of the dog clutch to the freewheel.

The intermediate gear may for example be driven by the tensioning motor via a bevel gear mechanism. In this way, the drive force of the tensioning motor can be deflected, allowing a compact form of the spring-loaded accumulator drive.

The locking mechanism has for example a cam disk roller fixedly connected to the tensioning wheel, and a latching mechanism which fixes the cam disk roller in order to lock the tensioning wheel. This allows a reliable and releasable locking of the tensioning wheel with a simple and low-cost locking mechanism.

A spring-loaded accumulator drive according to the invention has a tensioning mechanism according to the invention. The advantages of such a spring-loaded accumulator drive result from the above-mentioned advantages of a tensioning mechanism according to the invention.

The above-mentioned properties, features and advantages of this invention, and the manner in which they are achieved, will become clearer and more comprehensible in connection with the following description of exemplary embodiments, which are explained in more detail in connection with the drawings. The drawings show:

Parts corresponding to each other carry the same reference signs in the figures.

DETAILED DESCRIPTION OF THE INVENTION

Figure 1:
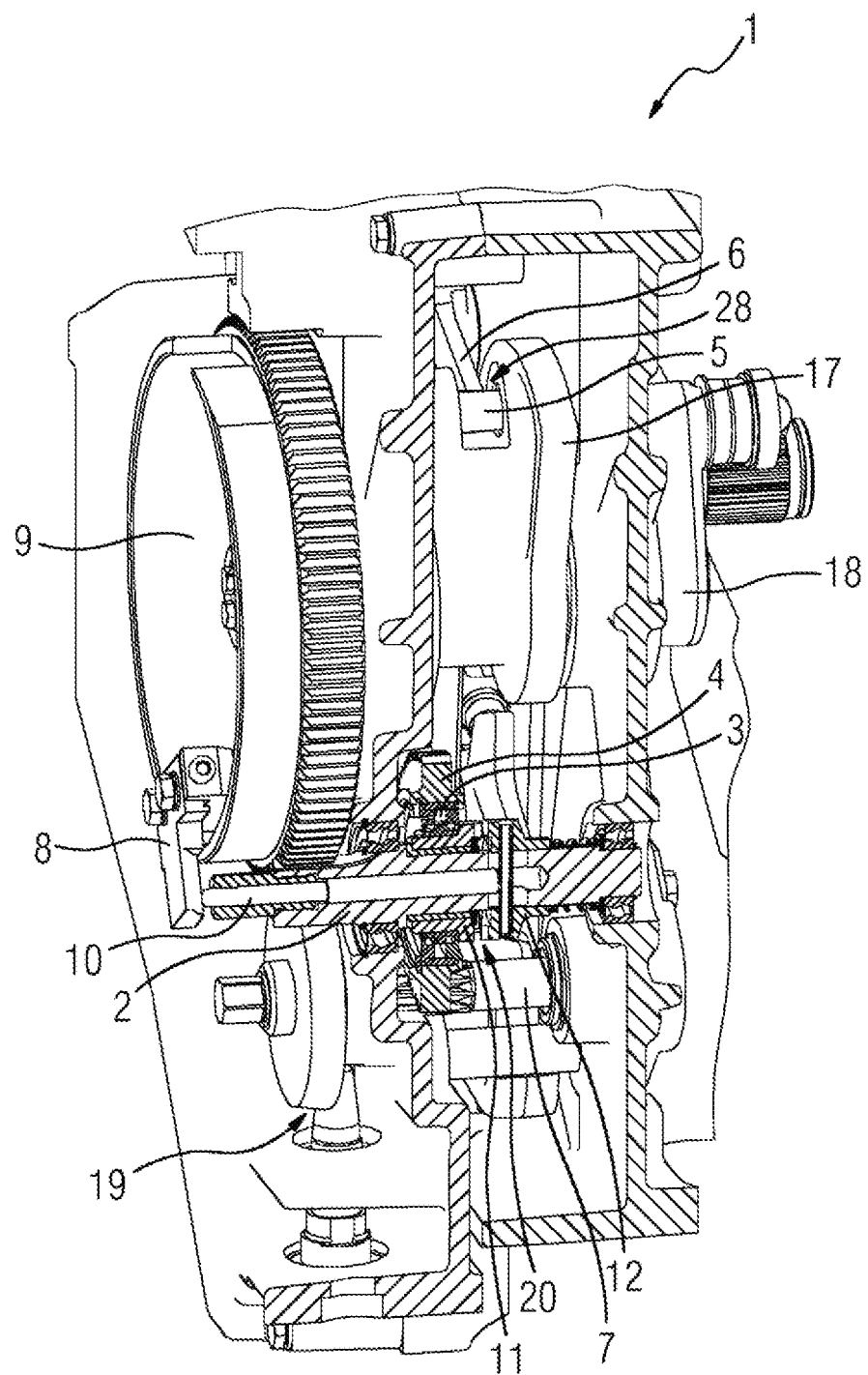
FIG. 1 a perspective and partially sectional depiction of a tensioning mechanism, and FIG. 2 an enlarged extract from FIG. 1.
Figure 2:
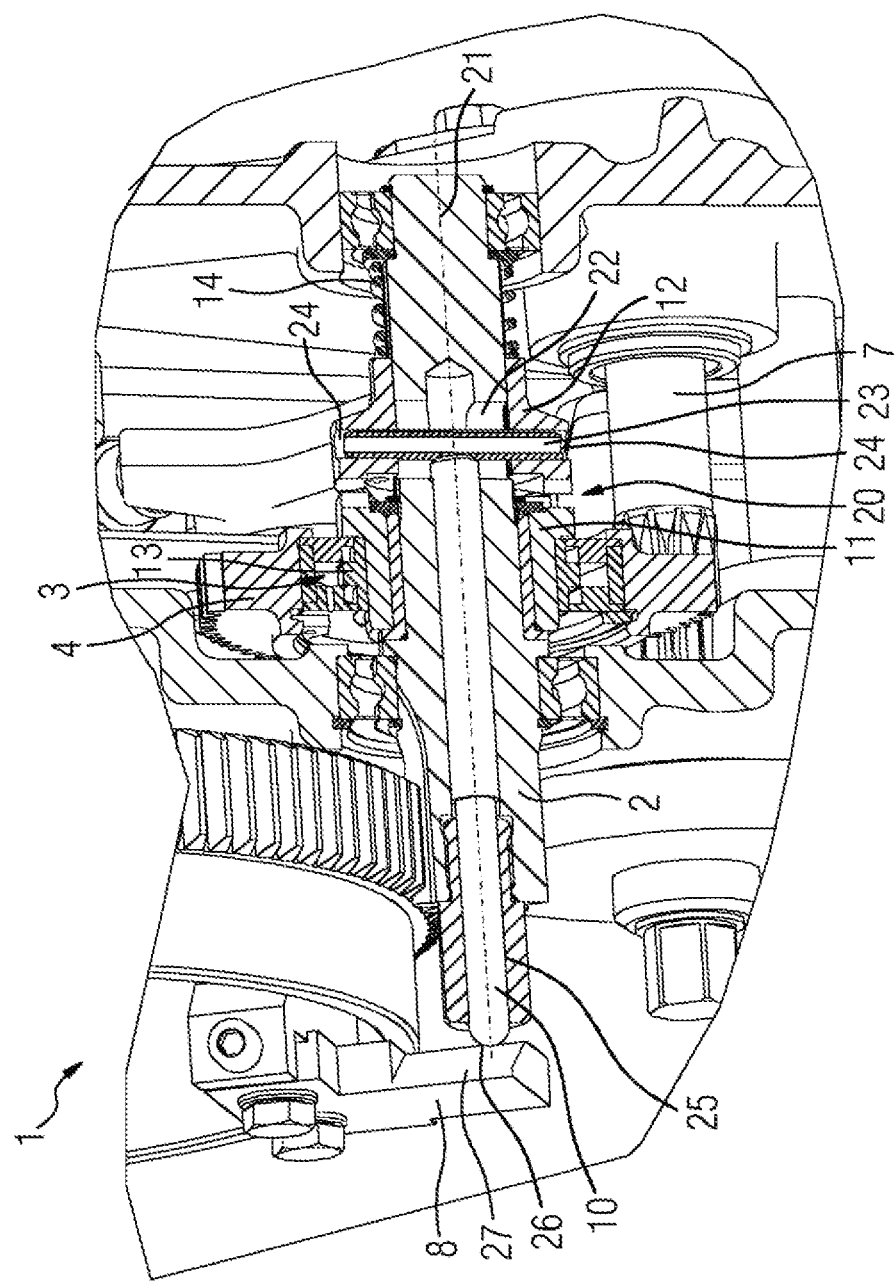

FIGS. 1 and 2 show a tensioning mechanism 1 for tensioning a pre-loaded spring (not shown) of a spring-loaded accumulator drive, in a perspective and partially sectional depiction, wherein FIG. 2 shows an enlarged extract from FIG. 1. The pre-loaded spring is for example an operating spring of a spring-loaded accumulator drive which stores energy for closing a current path of a circuit breaker. The tensioning mechanism 1 comprises inter alia a tensioning wheel 9, an intermediate shaft 2 and an intermediate gear 4.

The tensioning wheel 9 is fixedly connected to a cam disk 17 and a tensioning shaft 18, and coupled to the pre-loaded spring via the tensioning shaft 18.

The intermediate gear 4 can be driven by a tensioning motor (not shown) via a bevel gear mechanism 19.

The intermediate shaft 2 is coupled to the tensioning wheel 9 and the intermediate gear 4 in order to transmit rotations of the intermediate gear 4 to the tensioning wheel 9 for tensioning the pre-loaded spring. The coupling between the intermediate shaft 2 and the tensioning wheel 9 is a geared coupling, which is formed by a sprocket of the tensioning wheel 9 and a corresponding toothed ring of the intermediate shaft 2.

The intermediate gear 4 is coupled to the intermediate shaft 2 via a freewheel 3 and a dog clutch 20, wherein the freewheel 3 connects the intermediate gear 4 to the dog clutch 20. The dog clutch 20 has a first clutch jaw 12 coupled rotationally fixedly to the intermediate shaft 2, and a second clutch jaw 11 connected to a freewheel inner ring 13 of the freewheel 3. Both clutch jaws 11, 12 run in a ring form around the intermediate shaft 2.

The first clutch jaw 12 can be moved axially, i.e. parallel to a longitudinal axis 21 of the intermediate shaft 2, between a first end position in which it bears against the second clutch jaw 11 and which it assumes during tensioning of the pre-loaded spring, and a second end position in which it is separated from the second clutch jaw 11 and which it assumes when the pre-loaded spring is in a tensioned state. In this way, the dog clutch 20 couples the freewheel 3 and the intermediate gear 4 onto the intermediate shaft 2 in order to tension the pre-loaded spring, and decouples the freewheel 3 and the intermediate gear 4 from the intermediate shaft 2 when the pre-loaded spring is in the tensioned state.

The freewheel 3 decouples the intermediate gear 4 from the intermediate shaft 2 on tensioning of the pre-loaded spring, when the tensioning shaft 18 runs over a top dead center.

In order to couple the first clutch jaw 12 rotationally fixedly and axially movably to the intermediate shaft 2, the first clutch jaw 12 and the intermediate shaft 2 have for example a toothing.

In order to move the first clutch jaw 12 from its first end position into the second end position, the intermediate shaft 2 has a slot-like transverse opening 22 in the region of the first clutch jaw 12, which runs perpendicularly to the longitudinal axis 21 through the intermediate shaft 2. A coupling element 23 which is connected to the first clutch jaw 12 is guided through the transverse opening 22, and can be moved in the transverse opening 22 between a first position defining the first end position of the first clutch jaw 12 and a second position defining the second end position of the first clutch jaw 12. In the exemplary embodiment shown in the figures, the coupling element 23 is formed as a tube, the ends of which protrude into recesses 24 in the first clutch jaw 12. Alternatively, the coupling element 23 may however also for example be configured as a bolt.

Furthermore, the intermediate shaft 2 has a longitudinal opening 25 running along its longitudinal axis 21, and extending from the transverse opening 22 to an end of the intermediate shaft 2 on the tensioning wheel side. A switching pin 10, having a deactivation end 26 protruding from the longitudinal opening 25, is mounted in the longitudinal opening 25 so as to be axially movable and extends in the longitudinal opening 25 up to the coupling element 23.

A deactivation element 8 is arranged on the tensioning wheel 9 and, in the tensioned state of the pre-loaded spring, moves the deactivation end 26 of the switching pin 10 towards the longitudinal opening 25, so that the coupling element 23 is moved from its first position into its second position. The deactivation element 8 has a contact end protruding radially from the tensioning wheel 9 with an oblique contact face 27 which bears against the deactivation end 26 of the switching pin 10 on movement of the latter. The deactivation element 8 is arranged for example at a position on the tensioning wheel 9 in which the contact face 27 makes contact with the deactivation end 26 of the switching pin 10, when the tensioning wheel 9 has turned further through approximately three degrees after the tensioning shaft 18 has reached the top dead center.

Furthermore, a return spring 14 is coupled to the first clutch jaw 12 and runs in helical fashion around the intermediate shaft 2. The return spring 14 acts on an end of the first clutch jaw 12 facing away from the second clutch jaw 11, and in the second end position of the first clutch jaw 12 exerts a spring force on the first clutch jaw 12 in the direction of the first end position.

The tensioning mechanism 1 also comprises a locking mechanism 28 for releasable locking of the tensioning wheel 9 in the tensioned state of the pre-loaded spring. The locking mechanism 28 of the exemplary embodiment shown in the figures has a cam disk roller 5 arranged on the cam disk 17, and a latching mechanism 6 which fixes the cam disk roller 5 in order to lock the tensioning wheel 9. After separation of the clutch jaws 11, 12, the cam disk roller 5 runs against the latching mechanism 6 and is locked in this position by the latching mechanism 6, for example when the tensioning wheel 9 has turned further through around ten degrees after the tensioning shaft 18 has reached the top dead center. A rebound of the cam disk roller 5 away from the latching mechanism 6 is prevented by the freewheel 3 and a return block on an additional shaft 7 coupled to the intermediate gear 4.

Since, in tensioned state of the pre-loaded spring, the clutch jaws 11, 12 are separated from each other, the intermediate shaft 2 and the components coupled thereto, such as a latching mechanism 6 and the cam disk roller 5, are decoupled from the intermediate gear 4 in the tensioned state of the pre-loaded spring, and not loaded and tensioned by the intermediate gear 4, for example when the tensioning motor runs on. In this way advantageously, in particular the load on the latching mechanism 6, the cam disk roller 5 and the freewheel 3 is reduced, preventing wear or damage to said components of the tensioning mechanism 1 because of said load.

To dissipate the energy stored in the tensioned pre-loaded spring, the coupling of the latching mechanism 6 to the cam disk roller 5 is released. The relaxing pre-loaded spring turns the tensioning wheel 9 in the same rotational direction as during tensioning of the pre-loaded spring, whereby the deactivation element 8 releases the switching pin 10 again, and the first clutch jaw 12 is moved by the return spring 14 from the second end position into the first end position, so that the dog clutch 20 is closed again. The tensioning mechanism 1 is thereby ready for further tensioning of the pre-loaded spring.

Although the invention has been illustrated and described in detail with preferred exemplary embodiments, the invention is not restricted by the examples disclosed, and other variations may be derived therefrom by the person skilled in the art without leaving the scope of protection of the invention.

The invention claimed is:

1. A tensioning mechanism for tensioning a pre-loaded spring of a spring-loaded accumulator drive, the tensioning mechanism comprising:
a tensioning wheel coupled to the pre-loaded spring;
an intermediate shaft coupled to said tensioning wheel;
an intermediate gear to be driven by a tensioning motor;
a freewheel coupled to said intermediate gear;
a locking mechanism for releasably locking said tensioning wheel when the pre-loaded spring is in a tensioned state;
a dog clutch configured to couple said freewheel to said intermediate shaft in order to tension the pre-loaded spring, and to decouple said freewheel from said intermediate shaft when the pre-loaded spring is in the tensioned state; said dog clutch having a first clutch jaw coupled rotationally fixedly to said intermediate shaft, and a second clutch jaw connected to said freewheel, wherein said first clutch jaw is movable between a first end position in which said first clutch jaw bears against said second clutch jaw and a second end position in which said first clutch jaw is separated from said second clutch jaw and which said first clutch jaw assumes when the pre-loaded spring is in the tensioned state; and
a coupling element coupling said first clutch jaw to said intermediate shaft, wherein said coupling element is guided through a transverse opening formed in said intermediate shaft, running perpendicularly to a longitudinal axis of said intermediate shaft, and is movable in said transverse opening parallel to the longitudinal axis of said intermediate shaft between a first position defining the first end position of said first clutch jaw and a second position defining the second end position of said first clutch jaw.

2. The tensioning mechanism according to claim 1, wherein said coupling element is a tube or a bolt having a longitudinal axis, and where the longitudinal axis of said coupling element is arranged perpendicularly to the longitudinal axis of said intermediate shaft and having ends that project into recesses in said first clutch jaw.

3. The tensioning mechanism according to claim 1, further comprising a switching pin which is slideably mounted in said intermediate shaft in a longitudinal opening running along the longitudinal axis of said intermediate shaft and coupled to said coupling element.

4. The tensioning mechanism according to claim 3, wherein said switching pin has a deactivation end that protrudes out of said longitudinal opening, and wherein a deactivation element is arranged on the tensioning wheel for moving said deactivation end of said switching pin towards the longitudinal opening when the pre-loaded spring is in the tensioned state, so that said coupling element is moved from a first position into a second position thereof.

5. The tensioning mechanism according to claim 4, wherein said deactivation element has a contact end which protrudes radially from the tensioning wheel and which is formed with an oblique contact face that bears on said deactivation end of said switching pin upon movement of the said switching pin.

6. The tensioning mechanism according to claim 5, wherein each of said first and second clutch jaws runs in a ring form around said intermediate shaft.

7. The tensioning mechanism according to claim 1, wherein each of said first and second clutch jaws runs in a ring form around said intermediate shaft.

8. The tensioning mechanism according to claim 1, further comprising a return spring coupled to said first clutch jaw, and wherein said return spring, in the second end position of said first clutch jaw, exerts a spring force on said first clutch jaw in a direction of the first end position.

9. The tensioning mechanism according to claim 1, wherein said freewheel has a freewheel ring running around said intermediate shaft, and said second clutch jaw is connected to said freewheel ring.

10. The tensioning mechanism according to claim 1, further comprising a bevel gear mechanism configured for said intermediate gear to be driven by the tensioning motor.

11. The tensioning mechanism according to claim 1, wherein said locking mechanism comprises a cam disk roller fixedly connected to said tensioning wheel, and a latching mechanism disposed to fix said cam disk roller for locking said tensioning wheel.

12. A spring-loaded accumulator drive, comprising a tensioning mechanism according to claim 1.

* * * * *